Patented May 13, 1941

2,241,417

UNITED STATES PATENT OFFICE 2,241,417

HIGHER ALIPHATIC ALCOHOLS

Wilhelm Normann, Chemnitz, Germany; Martha Normann, administratrix of Wilhelm Normann, deceased, assignor to American Hyalsol Corporation, Wilmington, Del., a corporation of Delaware No Drawing. Application February 10, 1933, Serial No. 656,197. In Germany January 27, 1930

8 Claims. (Cl. 260—638)

The higher aliphatic alcohols heretofore were made by reducing the esters of the corresponding organic acids by means of sodium and lower aliphatic alcohols. This process is however relatively expensive and little suited for use on a large commercial scale.

It has now been found that the higher aliphatic alcohols, say from eight atoms of carbon upward, may be obtained smoothly and in good yield from the corresponding fatty acid esters, by catalytic reduction by means of hydrogen upon working in accordance with certain conditions. Finely divided metallic copper which may be deposited on a suitable carrier, for example, kieselguhr, is used as the catalyst. If hydrogen be caused to act on the fatty acid ester to be reduced, at 300°–400° C., in the presence of the copper catalyst and under a pressure of 100–200 atmospheres, the corresponding alcohol will be obtained in a very good yield. Alcohols in a somewhat lesser yield may be obtained by carrying out the reactions at lower or higher temperatures and/or pressure, for example, at other temperatures within the range of about 200° to 450° C. or other pressures within the range of about 60 to 500 atmospheres.

The unexpected fact has now been discovered that other known catalytic metals, for example, nickel, platinum and palladium, at the preferred temperature and pressure conditions stated, produce a further reduction to the hydrocarbon stage, so that only very little alcohol is obtained. Though the copper catalyst is preferred for the production of alcohols, hydrogenating catalysts in general may be used with at least some degree of success, examples of the same being the metals, tin, cadmium, silver, and/or their oxides and the oxides of zinc, chromium, magnesium and manganese. Thus, metallic copper shows the specific effect that it catalyzes only the first step of the reduction process, namely the conversion of the ester into the alcohol, but not the further reduction into the hydrocarbon, so that it becomes possible to obtain the product of the first reduction step nearly quantitatively.

The instant invention is independent of the method by which the contact between the ester, hydrogen and catalyst is obtained so long as the temperature and pressure conditions disclosed are employed. The contact between the catalyst and the ester may be effected by ordinary mixing, or the ester may be flowed past the catalyst held in a stationary position.

Example

The ethyl ester of lauric acid is mixed with such amount of a copper catalyst that the weight of the copper present is 2% of the weight of the ester. Hydrogen is allowed to act on the mixture in a closed reaction vessel, at a pressure of about 100–200 atmospheres and at a temperature of about 350° C. The normal primary alcohol $C_{12}H_{25}OH$ (lauric alcohol) is obtained with a smoothly proceeding reaction resulting in a very good yield.

It is also possible to use, instead of the ethyl ester of lauric acid, the ester mixture which results upon esterifying all the fatty acids of cocoanut fat with ethyl alcohol or some other lower aliphatic alcohol. When the mixture of ethyl esters is employed, the fraction boiling between 255° and 275° C. is used. The esters of other higher fatty acids with univalent alcohols, as well as the corresponding glycerin esters may also be processed in an analogous way. Thus the conversion of the naturally occurring fatty acid glycerids into other esters may be eliminated and the mixtures of glycerids or individual glycerids isolated therefrom may be subjected to the reduction in the manner described.

The products obtained may be used for many commercial purposes, for example in the various branches of the art of textile improvement, and may be employed without further refining or separation. They are in particular excellently suitable for making sulfurized products, because, even if they do not contain 100% of alcohols, yet they do contain nearly 100% of sulfurizable constituents, which may include also the admixed unsaturated compounds.

This application is a continuation in part of applicant's co-pending application, Serial No. 510,326, filed January 21, 1931.

Having thus described the invention, what is claimed as new and desired to be secured by Letters Patent is:

1. The process for the production of alcohols of high molecular weight which comprises passing a glyceride of a carboxylic acid having more than 8 carbon atoms in the acid radical with hydrogen, while heating to a temperature of the range from 200° to 400° C., over a copper containing hydrogenation catalyst.

2. The process for the catalytic hydrogenation of glyceride of aliphatic alkyl mono-carboxylic acids having more than 8 carbon atoms in the acid radical which comprises passing vapors of the said esters together with hydrogen, while heating to a temperature of the range from 200° to 400° C., over a copper containing hydrogenation catalyst.

3. The process of preparing higher aliphatic alcohols having at least eight carbon atoms comprising treating a glyceride of an aliphatic acid having more than eight carbon atoms with hydrogen in the presence of a metallic copper catalyst at a temperature in excess of 200° C. and under superatmospheric pressure.

4. The process for the production of alcohols of high molecular weight which comprises passing a glyceride of a carboxylic acid having more than 8 carbon atoms in the acid radical with hydrogen while heating to a temperature of the range from 200° to 400° C. over a metallic copper catalyst.

5. The process of preparing higher aliphatic alcohols from the corresponding glycerides having more than 8 carbon atoms in the acid radical comprising reacting a mixture of such a glyceride and hydrogen at a temperature in excess of 200° C. under a superatmospheric pressure in the presence of a copper containing hydrogenating catalyst.

6. The process of reducing glycerides of higher aliphatic acids into their corresponding higher aliphatic alcohols comprising reacting such a glyceride with hydrogen at a temperature of from 300° to 400° C. under a pressure of from 100 to 200 atmospheres in the presence of a copper catalyst.

7. The process of producing alcohols in very good yields through treatment carried out in the liquid phase, which comprises mixing a glyceride of a carboxylic acid, the number of carbon atoms in said acid being greater than the number of carboxyl groups, said glyceride being in a liquid state with a copper containing hydrogenation catalyst and contacting hydrogen with said mixture at a temperature of from 200 to 400° C. and under superatmospheric pressure.

8. The process of preparing higher aliphatic alcohols from naturally occurring glycerides containing fatty acid radicals of at least 8 carbon atoms comprising reacting such naturally occurring fatty acid glycerides and hydrogen at a temperature below 400° C. under a superatmospheric pressure in the presence of a copper containing hydrogenating catalyst.

WILHELM NORMANN.